United States Patent [19]

Traut

[11] 4,085,980

[45] Apr. 25, 1978

[54] TOOTHED ROLLING CONTACT DEVICES

[76] Inventor: Earl W. Traut, 8040 Palm Lake Dr., Orlando, Fla. 32811

[21] Appl. No.: 750,257

[22] Filed: Dec. 13, 1976

Related U.S. Application Data

[62] Division of Ser. No. 437,937, Jan. 30, 1974, Pat. No. 3,998,506.

[51] Int. Cl.$^2$ .............................................. F16C 33/36
[52] U.S. Cl. ..................................... 308/205; 308/215
[58] Field of Search ............... 308/202, 204, 205, 215, 308/216, 217, 218, 234, 235

[56] References Cited

U.S. PATENT DOCUMENTS

| 568,898 | 10/1896 | Gilliland | 308/205 |
| 2,355,843 | 8/1944 | Best | 308/205 |

*Primary Examiner*—Richard A. Bertsch

[57] ABSTRACT

Radial and axial load bearing devices in which loads are transferred from a race through rollers to a second race, the races having projections which fit into recesses in the rollers, thus providing separation between the rollers and also avoiding sliding friction.

1 Claim, 3 Drawing Figures

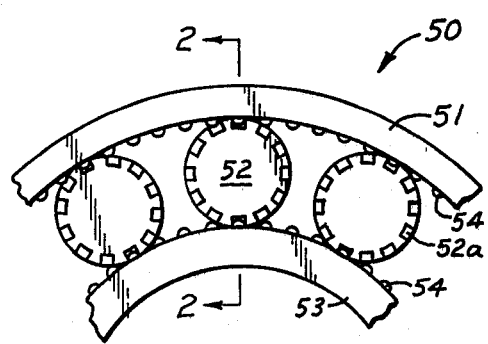
Fig-1
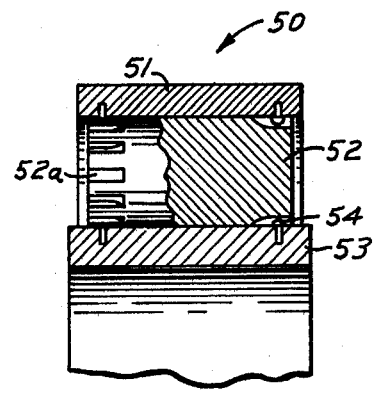
Fig-2
Fig-3
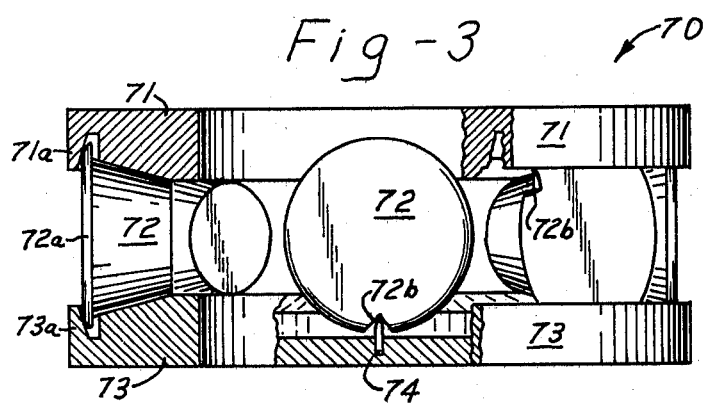

TOOTHED ROLLING CONTACT DEVICES

This is a division of application Ser. No. 437,937, filed Jan. 30, 1974, now U.S. Pat. No. 3,998,506.

BACKGROUND OF THE INVENTION

In typical roller bearings and similar devices which support rotating elements, there is sliding friction between rotating elements, cages, or supporting components. This sliding friction is undesireable in that it causes heat, wear, and the necessity for providing lubrication. Although other types of rolling contact bearings have been devised, they are often complex, include components rotating at high speeds, or must be constructed to very close tolerances.

SUMMARY OF THE INVENTION

The invention provides axial and radial load rolling contact bearing devices which are capable of supporting rotating components with a minimum of friction. They comprise two bearing races with interposed rollers, the races having projections which mate with recesses in the roller. These projections and recesses keep the rollers separated and in the same position relative to each other, thus precluding sliding contact between them. The projections and recesses can have simple shapes which assure their engagement at the lines of rolling contact only, thus also excluding sliding friction at these locations. As few positioning means as one projection per race and one recess per roller, will assure separation between the rollers.

Accordingly, it is an object of the present invention to provide an improved rolling contact bearing which avoids sliding friction.

Another object of the invention is to provide a rolling contact bearing wherein there are zero clearances between components, thus providing for exact centering of rotating elements with zero displacement due to clearances.

Other objects of this invention will appear from the following description and appended claims, reference being had to the accompanying drawings forming a part of this specification wherein like reference characters designate corresponding parts in the several views.

FIG. 1 is a face view of a radial load rolling contact bearing which utilizes projections on its races engaging with slots in its rollers to provide separation between its rollers.

FIG. 2 is a vertical sectional view taken along line 2–2 of FIG. 1 and looking in the direction of the arrows.

FIG. 3 is a side view of an axial load rolling contact bearing whose left end is vertically sectioned and whose forward lip is removed so as to reveal a positioning pin and notched roller which demonstrate the means of providing separation between the rollers.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

FIGS. 1 and 2 depict device 50 which is a radial load rolling contact bearing. In device 50, radial loads are transferred through rolling line contacts between outer race 51, rollers 52 and inner race 53. Rounded projections 54 affixed to outer race 51 and inner race 53 engage slots 52a in the ends of rollers 52 to keep them at the same distance from each other. Any contact between projections 54 and slots 52a is ideally at the lines of rolling contact between the load bearing elements and thus there is no sliding friction at these contacts or anywhere else in the device. Milled slots 52a are depicted, but round holes or other indentations could also be used. Also, the projections could be mounted on rollers 52, with the slots or holes then being located in races 51 and 53. Almost any convenient shape of projection and hole may be used, provided their only contact is at the lines of rolling contact of the load bearing elements.

FIG. 3 represents device 70, which is similar to device 50 except that device 70 is an axial rather than a radial load bearing and that in device 70 a minimum number of projections and slots are used to provide separation between the rotating elements. Returning now to FIG. 3, it will be seen that upper race 71 is in rolling contact with conical rollers 72, which in turn are in rolling contact with lower race 73. A circular lip 72a on the radially outward end of each roller 72 is in rolling point contact with circular flange 73a of lower race 73. These points of rolling contact are continually aligned with the lines of contact between rollers 72 and race 73, there thus being no sliding friction thereat. Circular lips 72a are also in rolling point contact with circular flange 71a of upper race 71. Each roller 72 has a notch 72b which rolls over a pin 74 affixed to lower race 73 and over another pin 74 affixed to upper race 71, the upper pin not being shown in the figure. Upper and lower races 71 and 73 may be identical as shown. After assembly of device 70, rollers 72 must be positioned so that their notches will engage pins 74. Continuous contact must be maintained between the races and the rollers to prevent their displacement. The ratio of the diameter of either race to the diameter of the roller at any point of contact must be an integer to assure engagement of the pins and notches during continuous rotation; or, additional notches and/or pins may be provided.

In a variation of device 70, pin 74 would be moved onto the circular race surfaces of races 71 and 73, and each roller 72 would have a single hole to engage pins 73. As mentioned in conjunction with device 50, the shape of these holes and projections may be quite varied. Also, the projections could be located on the rollers instead of the races, with the holes then being located in the races.

I claim:

1. A rolling contact bearing comprising only:
   two bearing races,
   said bearing races being circular,
   one rotating means,
   said rotating means including a plurality of rollers,
   one projection on each said race,
   one notch in each said roller,
   said projections engaging said notches as said rollers roll against said races,
   said projections and said notches serving to maintain constant spacing between said rollers.

* * * * *